(12) United States Patent
Chen

(10) Patent No.: US 7,047,001 B2
(45) Date of Patent: May 16, 2006

(54) METHOD AND APPARATUS FOR MOBILE-TERMINATED SHORT DATA BURST COMMUNICATION

(75) Inventor: An Mei Chen, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 412 days.

(21) Appl. No.: 10/308,350

(22) Filed: Dec. 2, 2002

(65) Prior Publication Data

US 2004/0107294 A1 Jun. 3, 2004

(51) Int. Cl.
H04B 7/00 (2006.01)
(52) U.S. Cl. ............... 455/422.1; 455/414.2; 455/427; 370/95.3
(58) Field of Classification Search ........... 455/3.01, 455/422.1, 427, 456, 414.2; 370/95.3
See application file for complete search history.

(56) References Cited

U.S. PATENT DOCUMENTS

| | | | |
|---|---|---|---|
| 5,502,725 A | 3/1996 | Pohjakallio | 370/94.1 |
| 5,513,183 A | 4/1996 | Kay et al. | 370/95.3 |
| 6,038,223 A * | 3/2000 | Hansson et al. | 370/329 |
| 6,044,266 A | 3/2000 | Kato | 455/422 |
| 6,285,868 B1 * | 9/2001 | LaDue | 455/410 |

* cited by examiner

Primary Examiner—Krisna Lim
(74) Attorney, Agent, or Firm—Philip R. Wadsworth; Robert J. O'Connell (57) ABSTRACT

A method and apparatus for sending information to a target mobile station includes determining whether the information should be sent as short data burst messages while the target mobile station is in dormant mode, and sending the information to the target mobile station as short data burst messages, without waiting for the traffic channel to be reestablished.

28 Claims, 9 Drawing Sheets

METHOD AND APPARATUS FOR MOBILE-TERMINATED SHORT DATA BURST COMMUNICATION

FIELD

The present invention relates to communicating information in a global distributed network, such as the Internet. More specifically, the present invention relates to methods and apparatus for determining whether to send information to a target communication device in short data burst format, without waiting for the traffic channel to be an activated, when the target communication device is in dormant mode.

BACKGROUND

When an Internet protocol (IP) datagram carrying information destined for a target communication device is sent from a packet data service nodes (PDSNs) to a base station controller/packet control function (BSC/PCF) while the packet session is in dormant, the BSC/PCF needs to determine whether the information should be sent as short data bursts (SDBs). One algorithm is to use the size of the received information packet as a filtering criterion. That is, when the received information packet is found to be smaller than a predetermined size, the information packet may be sent to the target mobile station as SDB over the forward common channel, for example, without waiting for the traffic channel to be activated. Otherwise, traffic channel needs to be re-established before sending the information packet. This algorithm may not work well in group call services, for example, where clients and servers send messages varied in size when the data session is in dormant state. However, not all these messages are time critical and, therefore, need not to be sent as SDB. Some large messages may need to be sent as SDB while some small messages may need to be delivered after the traffic channel is re-established. Using a large packet size as a filtering criterion may trigger many small messages to be sent as SDB and, therefore, cause extensive loading on the common channel. On the other hand, if a small packet size is used, larger messages that are time-critical may not be immediately sent as SDB.

There is a need, therefore, for mechanisms to determine what messages need to be communicated in SDB such that no time-sensitive message is delayed.

SUMMARY

The disclosed embodiments provide novel and improved methods and apparatus for determining whether information destined for a target mobile station is marked to be sent as short data burst. The method includes receiving an information packet destined to a target mobile station, parsing the received information packet, and determining whether the received information packet is marked to be sent as short data burst messages.

The disclosed embodiments further provide novel and improved methods and apparatus for marking information for short data burst (SDB) delivery in a wireless communication network. The method includes encapsulating information in a datagram, where the datagram includes a header portion, and marking the header portion of the datagram such that a wireless communication infrastructure delivers the information encapsulated in the datagram to a destination as SDB messages.

In another aspect, an apparatus for communicating information destined for a target mobile station includes a memory unit, a receiver, a transmitter, and a processor communicatively coupled with the memory unit, the receiver, and the transmitter. The processor is capable of executing instructions to carry out the above-mentioned methods.

BRIEF DESCRIPTION OF THE DRAWINGS

The features and advantages of the present invention will become more apparent from the detailed description of disclosed embodiments set forth below when taken in conjunction with the drawings, and wherein.

DETAILED DESCRIPTION

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

Figure 1:
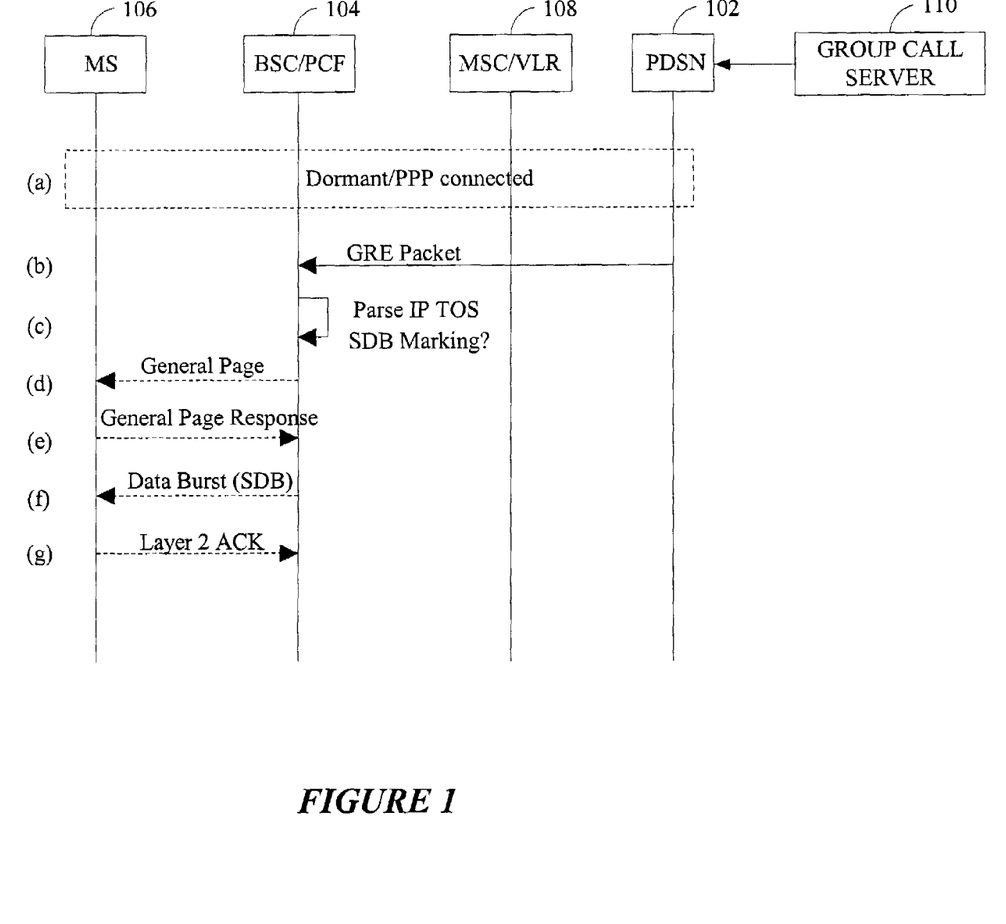
FIG. 1 illustrates a call-flow diagram for delivering mobile-terminated short data bursts.

FIG. 1 illustrates a call flow diagram for mobile-terminated short data burst information delivery during dormant packet data session. During dormancy state, the point-to-point protocol (PPP) session is maintained, but traffic channel is deactivated. Information arrived at the PDSN 102, e.g., as IP datagram(s), is sent to BSC/PCF 104, in step (b). BSC/PCF 104 then makes a determination as to how to send the information, in step (c). In step (c), BSC/PCF 104 parses the received information. If the type of service (TOS) field in the header portion of the received IP datagram is marked for SDB delivery, then BSC/PCF 104 uses steps (d) through (g) to deliver the information as SDB. If BSC/PCF 104 determines that the received information should be sent as SDB, BSC/PCF 104 first performs a general page, in step (d), to locate the target mobile station. Subsequently, the information is sent as SDB over the common channel, for example, to the mobile station (MS) 106, in step (f). The target mobile station may be identified in the mobile's general page response message received in step (e). Otherwise, if BSC/PCF 104 determines that the received information should not be sent as SDB, BSC/PCF 104 relies on mobile station controller (MSC) 108 to locate the target mobile station, e.g., through the general page procedure, re-establish the traffic channel, and then sends the information. This procedure is not shown in the diagram.

Figure 2:
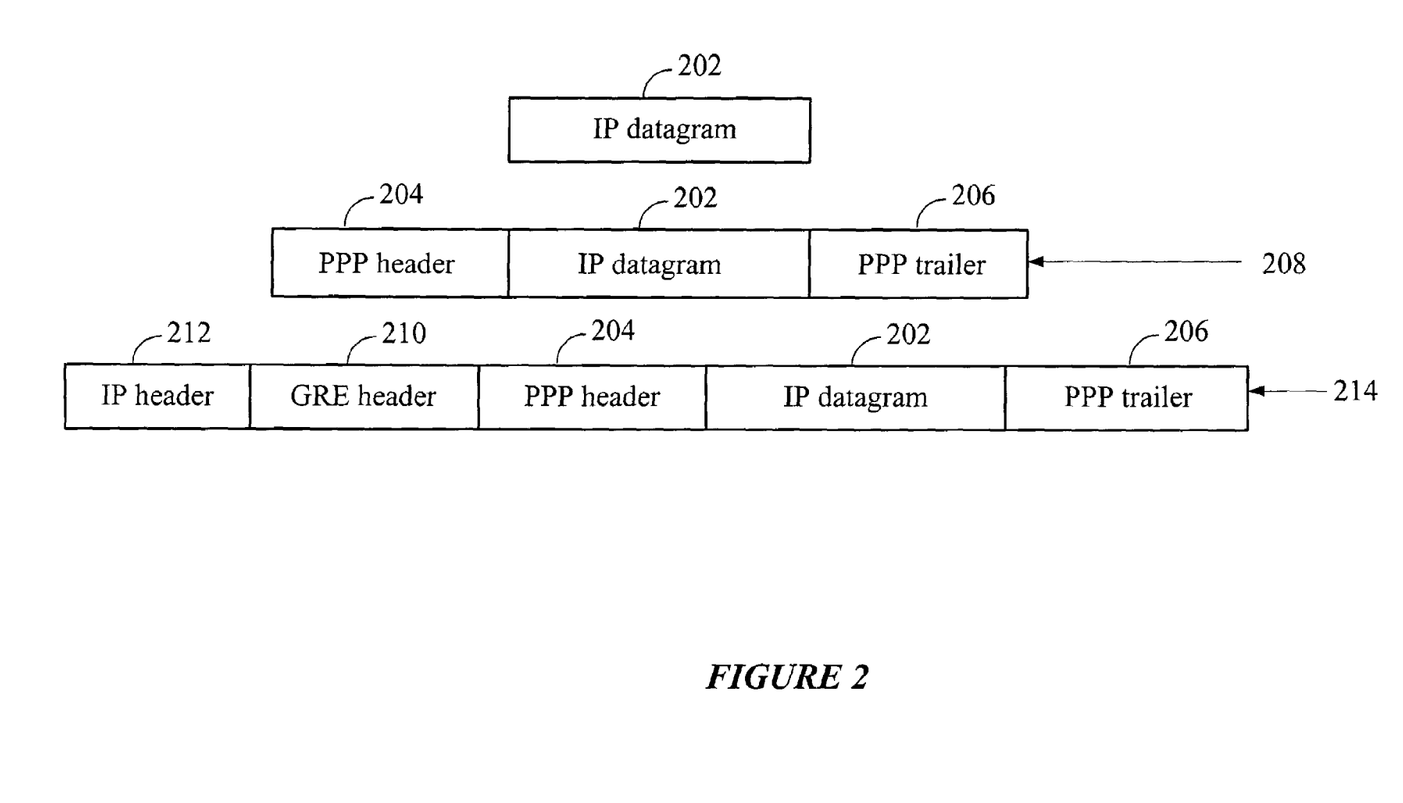
FIG. 2 illustrates an IP datagram being framed and encapsulated.

In one embodiment, a network entity, such as a group call server 110, may provide the information destined for the target MS 106 as an IP datagram. PDSN 102 encapsulates the received IP datagram before sending it to the BSC/PCF 104. FIG. 2 illustrates an IP datagram framing process, according to one embodiment. IP datagram 202 may include a header portion and an information portion. If PDSN 102 is a PPP peer of MS 106, PDSN 102 may encapsulate the received IP datagram 202 inside a PPP header 204 and a PPP trailer 206, forming a PPP frame 208.

According to one embodiment, as described in TIA/EIA/IS-2001, "Interoperability Specification (IOS) for cdma2000 Access Network Interfaces," August 2001, (IOSv4.1), before sending the information to the BSC/PCF 104, PDSN 102 adds generic routing encapsulation (GRE) header 210 and IP header 212 to the received PPP frame 208, forming the GRE packet 214. The GRE packet 214 is treated as an IP payload and is addressed to the BSC/PCF 104 on an A10 connection, for example.

After receiving GRE packets 214, BSC/PCF 104 removes the GRE header 210 and IP header 212 from the received GRE packet 214 and may add appropriate headers before sending the information over the air interface to the target MS 106. As discussed above, when the packet data session is dormant, BSC/PCF 104 needs to examine the received PPP frame 208 to determine where the header portion of the IP datagram 202 begins, before starting to parse the IP datagram 202, as will be discussed later, herein.

It is possible that a single GRE packet 214 contains an incomplete PPP frame or multiple PPP frames as specified in TIA/EIA/IS-835, "Wireless IP Network Standard," Dec. 6, 2001. In such cases, the standard specifies that a sequence number field included in the GRE header 210 may be used to ensure sequential delivery of the packets. In the event that the sequence number of GRE header 210 is enabled, BSC/PCF 104 re-sequences the received GRE packets before parsing the PPP frame.

Figure 3:
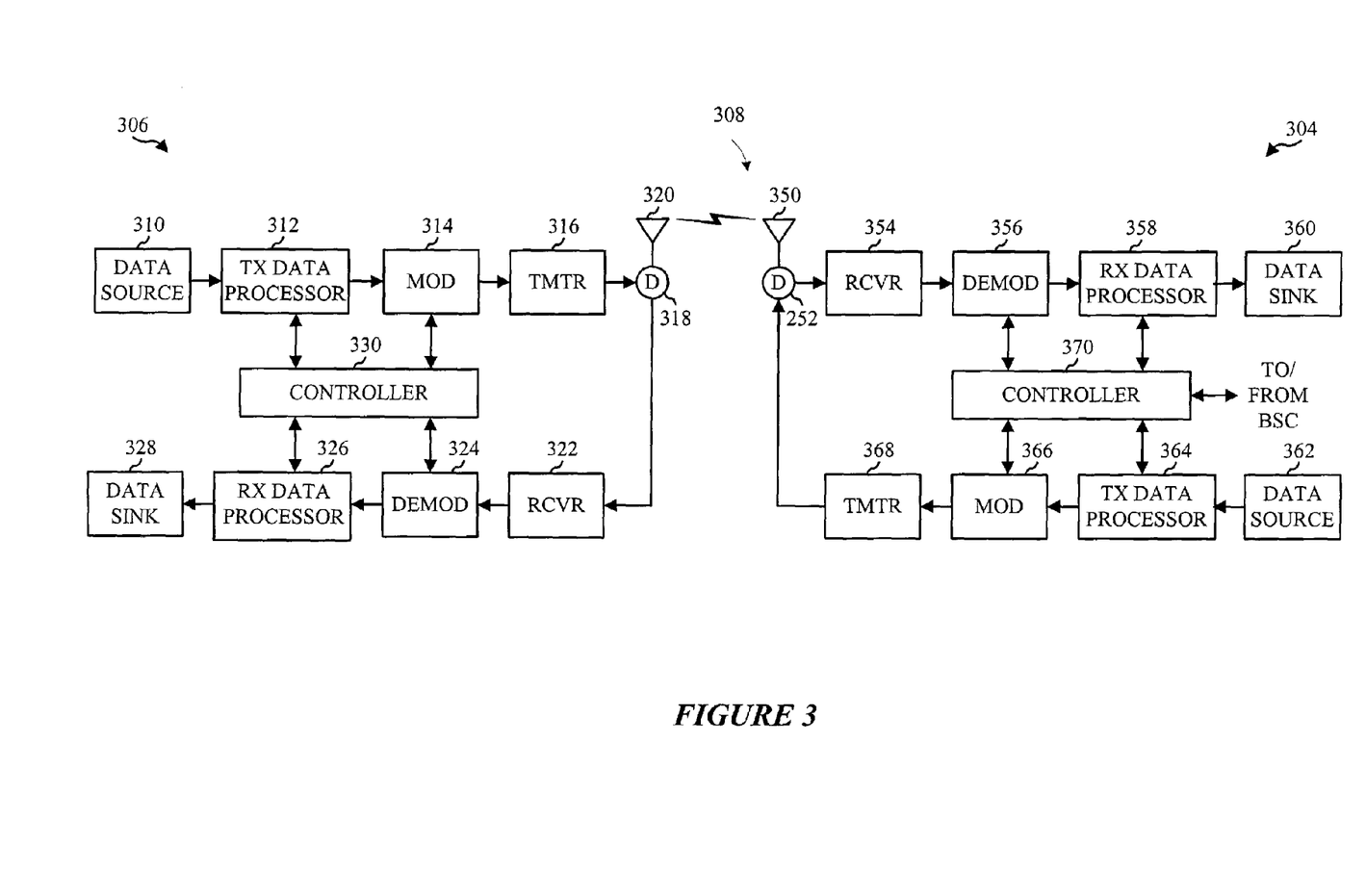
FIG. 3 illustrates an embodiment for a base station and a mobile station.

FIG. 3 is a simplified block diagram of an embodiment of a BSC/PCF 304 and mobile station 306, which are capable of implementing various disclosed embodiments. For a particular communication, voice data, packet data, and/or messages may be exchanged between BSC/PCF 304 and mobile station 306, via an air interface 308. Various types of messages may be transmitted, such as messages used to establish a communication session between the BSC/PCF 304 and mobile station 306, registration and paging messages, and messages used to control a data transmission (e.g., power control, data rate information, acknowledgment, and so on). Some of these message types are described in further detail below.

For the reverse link, at BSC/PCF 306, voice and/or packet data (e.g., from a data source 310) and messages (e.g., from a controller 330) are provided to a transmit (TX) data processor 312, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 314 and further processed (e.g., covered, spread with short PN sequences, and scrambled with a long PN sequence assigned to the user terminal). The modulated data is then provided to a transmitter unit (TMTR) 316 and conditioned (e.g., converted to one or more analog signals, amplified, filtered, and quadrature modulated) to generate a reverse link signal. The reverse link signal is routed through a duplexer (D) 318 and transmitted via an antenna 320 to BSC/PCF 304.

At BSC/PCF 304, the reverse link signal is received by an antenna 350, routed through a duplexer 352, and provided to a receiver unit (RCVR) 354. BSC/PCF 304 may receive registration information and status information, e.g., mobile station location information, from mobile station 306. Receiver unit 354 conditions (e.g., filters, amplifies, down converts, and digitizes) the received signal and provides samples. A demodulator (DEMOD) 356 receives and processes (e.g., despreads, decovers, and pilot demodulates) the samples to provide recovered symbols. Demodulator 356 may implement a rake receiver that processes multiple instances of the received signal and generates combined symbols. A receive (RX) data processor 358 then decodes the symbols to recover the data and messages transmitted on the reverse link. The recovered voice/packet data is provided to a data sink 360 and the recovered messages may be provided to a controller 370. Controller 370 may include instructions for paging a group of mobile stations, which may be based on the mobility of the mobile stations. The processing by demodulator 356 and RX data processor 358 are complementary to that performed at base station 306. Demodulator 356 and RX data processor 358 may further be operated to process multiple transmissions received via multiple channels, e.g., a reverse fundamental channel (R-FCH) and a reverse supplemental channel (R-SCH). Also, transmissions may be simultaneously from multiple mobile stations, each of which may be transmitting on a reverse fundamental channel, a reverse supplemental channel, or both.

On the forward link, at BSC/PCF 304, voice and/or packet data (e.g., from a data source 362) and messages (e.g., from controller 370) are processed (e.g., formatted and encoded) by a transmit (TX) data processor 364, further processed (e.g., covered and spread) by a modulator (MOD) 366, and conditioned (e.g., converted to analog signals, amplified, filtered, and quadrature modulated) by a transmitter unit (TMTR) 368 to generate a forward link signal. The forward link signal is routed through duplexer 352 and transmitted via antenna 350 to BSC/PCF 306. Forward link signals include paging signals.

At BSC/PCF 306, the forward link signal is received by antenna 220, routed through duplexer 318, and provided to a receiver unit 322. Receiver unit 322 conditions (e.g., down converts, filters, amplifies, quadrature modulates, and digitizes) the received signal and provides samples. The samples are processed (e.g., despreaded, decovered, and pilot demodulated) by a demodulator 324 to provide symbols, and the symbols are further processed (e.g., decoded and checked) by a receive data processor 326 to recover the data and messages transmitted on the forward link. The recovered data is provided to a data sink 328, and the recovered messages may be provided to controller 330. Controller 330 may include instructions for registering BSC/PCF 306, which may be based on the mobility of the mobile station.

IP Type of Service (TOS) Bits

Figure 4:
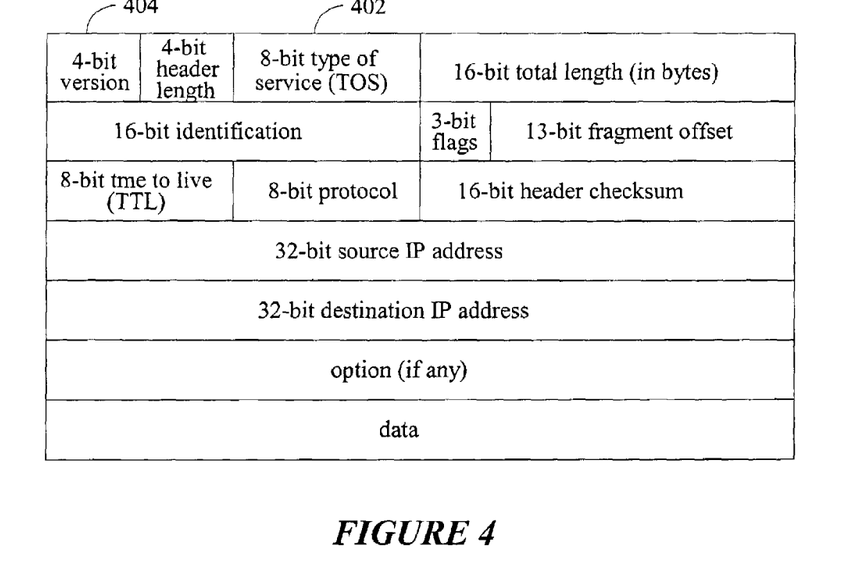
FIG. 4 illustrates a header portion for the IP datagram shown in FIG. 2.
Figure 5:
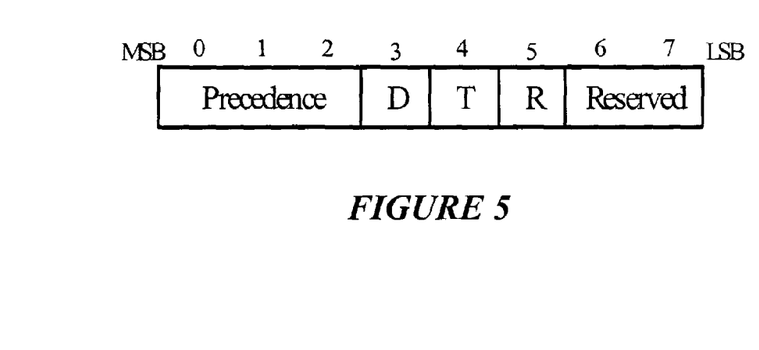
FIG. 5 illustrates a type of service field for the header portion shown in FIG. 4, according to one embodiment.

FIG. 4 illustrates a header portion for the IP datagram 202 shown in FIG. 2, according to one embodiment, e.g., IP version 4 (IPv4). The IP type of service (TOS) field 402 is the second byte within the header portion of the IP datagram 202. There exist three widely accepted mappings of TOS bits to service definition for IPv4. The first mapping is defined in RFC 791, "Internet protocol," September 1981. In this RFC, the TOS field has five subfields as shown in FIG. 5. Three "precedence" bits specify IP datagram precedence, with values ranging from zero (normal precedence) through seven (network control), allowing senders to indicate importance of each IP datagram. The next three bits are "D," "T," and "R." These bits may be used to specify the type of transport for the IP datagram. The last two bits are reserved bits. In one embodiment, the group call server 110 uses one or both of the reserved bits in the TOS field of the IP datagram to designate that a wireless communication infrastructure, as shown in FIG. 3, for example, should send the IP datagram to the target mobile station as SDM messages.

Figure 6:
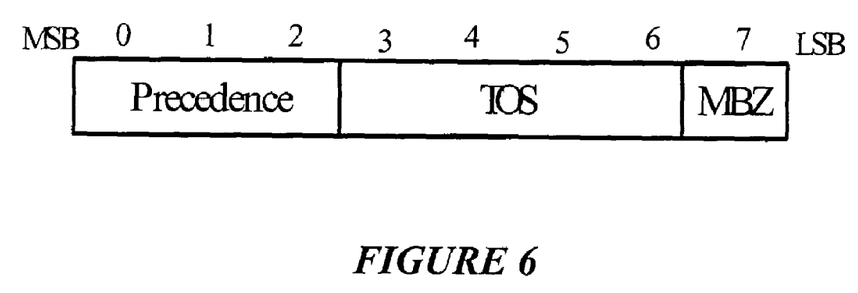
FIG. 6 illustrates a type of service field for the header portion shown in FIG. 4, according to another embodiment.

FIG. 6 illustrates another mapping for TOS bits for service definition, as defined in RFC 1439, "Type of Service in the Internet Protocol Suite," July 1999. Although this RFC updates the definition in RFC 791, many literatures and implementations still refer to the original definition in RFC 791. In RFC 1439, the precedence sub-field is the same as what is defined in RFC 791. The next four bits are considered as type of service (TOS) bits and the last bit as a must be zero (MBZ) bit. RFC 1439 re-defines the D, T, R bits as a 4-bit TOS field. RFC 1439 specifies that the originator of the datagram sets the last bit to zero unless participating in Internet protocol experiment that makes use of the last bit. Hence, this leaves only the last bit as an unused bit. In one embodiment, the group call server 110 uses the reserved bit in the TOS field to designate that a wireless communication infrastructure, as shown in FIG. 3, for example, should send the IP datagram to the target mobile station as SDM messages.

Figure 7:
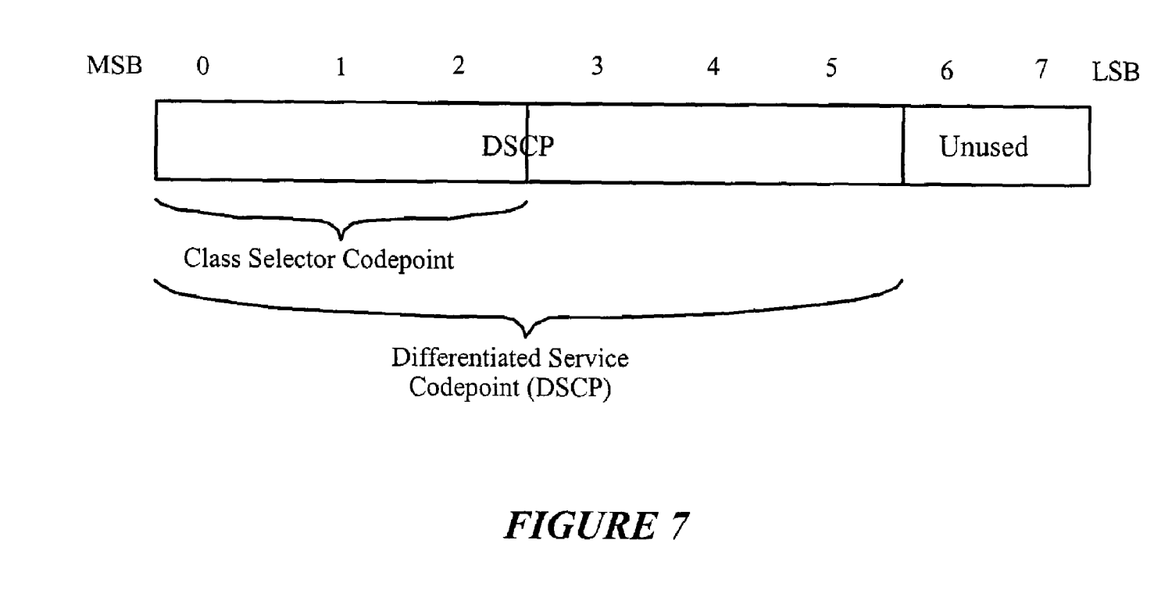
FIG. 7 illustrates a type of service field for the header portion shown in FIG. 4, according to yet another embodiment.

FIG. 7 illustrates the third service definition defined by the Internet engineering task force (IETF) differential service framework, as described in RFC 2474, "Definition of Differentiated Services Field (DS Field) in the IPv4 and IPv6 Headers," December 1998. This definition utilizes 6 bits of the differential service code point (DSCP) to indicate the per hop behavior (PHB) treatment for the IP datagram. The last two bits are reserved bits. In one embodiment, the group call server 110 uses one or both of the reserved bits in the TOS field to designate that a wireless communication infrastructure, as shown in FIG. 3, for example, should send the IP datagram to the target mobile station as SDM messages.

Figure 8:
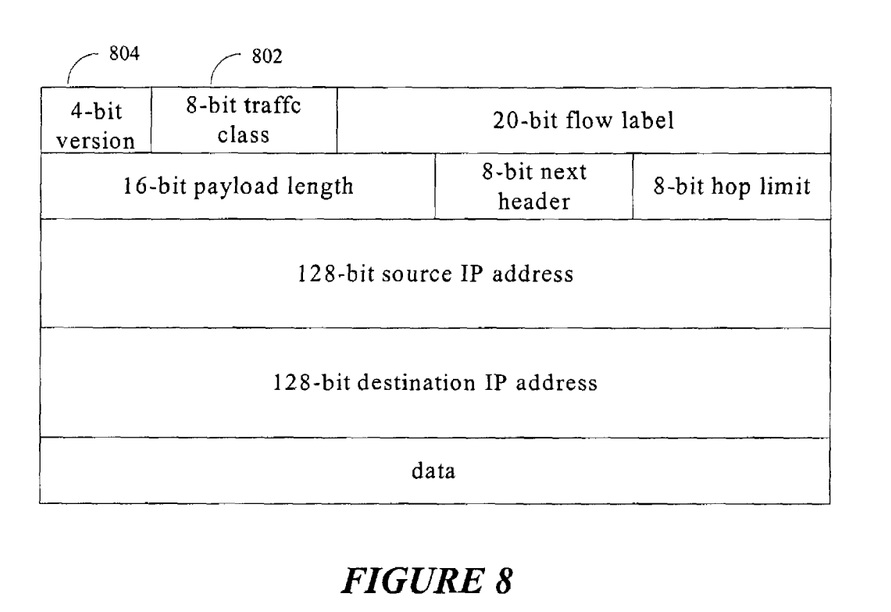
FIG. 8 illustrates an alternative header portion for the IP datagram shown in FIG. 2.

FIG. 8 illustrates header portion for the IP datagram 202 (FIG. 2) for IP version 6 (IPv6), according to RFC 2460, "Internet Protocol, Version 6 (IPv6) Specification," December 1998. The traffic class 802 is a one-byte field that immediately follows the 4-bit version field 804, as shown in FIG. 8. RFC 2460 leaves open in term of how the 8 bits of the traffic class 802 field are used. However, there is on-going IETF effort to adopt a service definition for IPv6 similar to the service definition of IPv4.

Going back to FIG. 6, given that the first 7 bits of the IPv4 header portion may be used for service definition mapping, the last bit may be used to indicate that the received information at BSC/PCF 104 should be sent to the target MS 106 as SDB messages. RFC 1812, "Requirements for IP Version 4 Routers," June 1995, puts a requirement on IPv4 routers not to drop packets if non-zero values are used in the reserved bit(s). Existing RFCs do not specify as how other new protocols may use the reserved bit(s). Hence, it is possible for BSC/PCF 104 to receive IP datagrams during dormant packet data session that have the reserved bit(s) marked other than zero. In addition, there is no RFC requirement indicating how IPv6 routers should treat the last bit of the 8-bit traffic class field in the IPv6 header.

For the remaining of this documnet, the term "IP TOS field" is used to indicate both IPv4 TOS field 402 and IPv6 traffic class field 802, depending the addressing scheme being considered. According to one embodiment, group call servers make use the unused bit(s) of the TOS field as a mechanism to indicate SDB delivery. For example, for the messages that need to be sent as SDB, group call servers may set the last bit of the IP TOS field to the value of 0x01.

Point-to-Point Protocol

As noted above, GRE packet 214 (FIG. 2) may contain multiple PPP frames or an incomplete PPP frame. BSC/PCF 104 extracts the GRE header 210 and IP header 212 from the received GRE packet 214, re-packages the information as radio link protocol (RLP) frames, and transmits the RLP frames over the air interface to the target MS 106. For BSC/PCF 104 to parse the IP TOS field, BSC/PCF 104 detects the beginning and end of a PPP frame 208. In this section, we examine the PPP frame structure and identify fields that may be negotiated during link control phase as specified in TIA/EIA/IS-835, "Wireless IP Network Standard," Dec. 6, 2001. More details on PPP may be found in RFC 1661, "The Point-to-Point Protocol (PPP)," July 1994.

Figure 9:
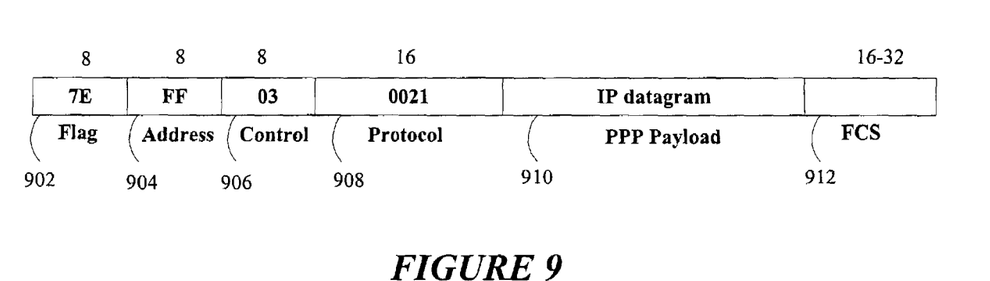
FIG. 9 illustrates a frame structure for the PPP frame shown in FIG. 2.

FIG. 9 illustrates a high level data link control (HDLC) frame structure for the PPP frame 208, according to RFC 1662, "PPP in HDLC-like Framing," July 1994. Fields 902 through 908 relate to PPP header 204 of PPP frame 208, field 910 refers to the IP datagram 202 of the PPP frame 208, and field 912 refers to PPP trailer 206 of PPP frame 208. The first field 902 is the "7E" flag to denote the beginning and/or the end of a PPP frame 208. The flag is followed by the HDLC frames 904, 906, 908.

According to RFC 1662, the address field 904 may be set to the octet 0xFF, and the control field 906 may be set to the octet 0x03. The HDLC information field contains the protocol field 908 and IP datagram (PPP payload) 910. For IP service, the protocol field 908 includes two octets with value of 0x0021, followed by an IP datagram 910. The last field in the HDLC packet is frame check sequence (FCS) 912, which may include two or four octets. Each PPP frame begins and ends with a flag sequence, and one flag sequence may be used between two frames. Two consecutive flag sequences constitute an empty frame. The end flag sequence is not shown in FIG. 9.

According to one embodiment, the link control protocol (LCP) negotiates modifications to the standard HDLC-like frame structure, which was described above. PPP peers may negotiate to compress address field 904 and control field 906. If compression is enabled, two octets are eliminated. In addition, PPP peers may negotiate to compress protocol field 908 to one byte, e.g., 0x21. Another negotiable parameter is the number of bits for cyclic redundancy check (CRC) in FCS field 912. PPP peers may negotiate for 16-bit CRC or 32-bit CRC.

PPP may perform bit stuffing before information is transmitted to achieve transparency for control characters. The control escape octet may be chsen to be 0x7D. As a minimum, RFC 1662 requires an implementation to escape the flag sequence, e.g., 0x7E, and the control escape octets, 0x7D. After FCS computation, the transmitter examines the entire frame between the two flag sequences and performs flag sequence escape. The values between 0x00 and 0x1F (inclusive) plus the values 0x7D and 0x7E may be escaped by the transmitter when sending the PPP frame.

Asynchronous control character map (ACCM) is an LCP option having a four-octet bit map that enables (bit set) or disables (bit clear) character escapes for the 32 ASCII control characters in the range 0x00 and 0x1F. For instance, the first octet of the ACCM value has the bits for control characters 0x19 through 0x1F, with the MSB indicating 0x1F and the LSB indicating 0x18. The second octet has bits for characters 0x10 through 0x17, and so on. The value 0xFFFFFFFF indicates that all control characters are escaped, according to *"PPP Design, Implementation, and Debugging,"* Carlson, James, Addison-Wesley, 2002. An ACCM value of 0x00000000 indicates no ASCII character valued between 0x00 and 0x1F are be escaped. Each flag sequence, control escape octet, and any octet which is flagged in sending ACCM is replaced by the control escape octet, e.g., 0x7D, followed by the original octet exclusive-or'd (XOR'ed) with octet 0x20.

For both Simple IP and mobile IP operations, TIA/EIA/IS-835, "Wireless IP Network Standard," Dec. 6, 2001, specifies control escaping for both mobile and PDSN. For PDSN, the standard requires the PDSN to negotiate a control character mapping with the minimum number of escaped characters by proposing an ACCM value of 0x00000000. On the other hand, the standard recommends that if the MS negotiates control character mapping, it should attempt the minimum number of escapes by negotiating an ACCM of 0x00000000. Hence, it is possible that BSC/PCF 104 receives PPP frames from PDSN 102 where not only the flag sequence but also characters from 0x00 and 0x1F are escaped.

When BSC/PCF 104 is not PDSN's PPP peer, BSC/PCF 104 may not be aware as to which LCP parameters, e.g., address field 904 control Field 906, and protocol field 908 are negotiated between the MS 106 and the PDSN 102. Hence, besides determining the PPP framing, BSC/PCF 104 determines which fields are compressed and whether any characters are being escaped to properly identify the beginning of the header portion of the IP datagram 202, in order to parse the IP TOS bits. In the next section, the algorithm that the BSC/PCF 104 uses to parse the PPP frame is described.

PPP Frame Parsing Algorithm

Figure 10:
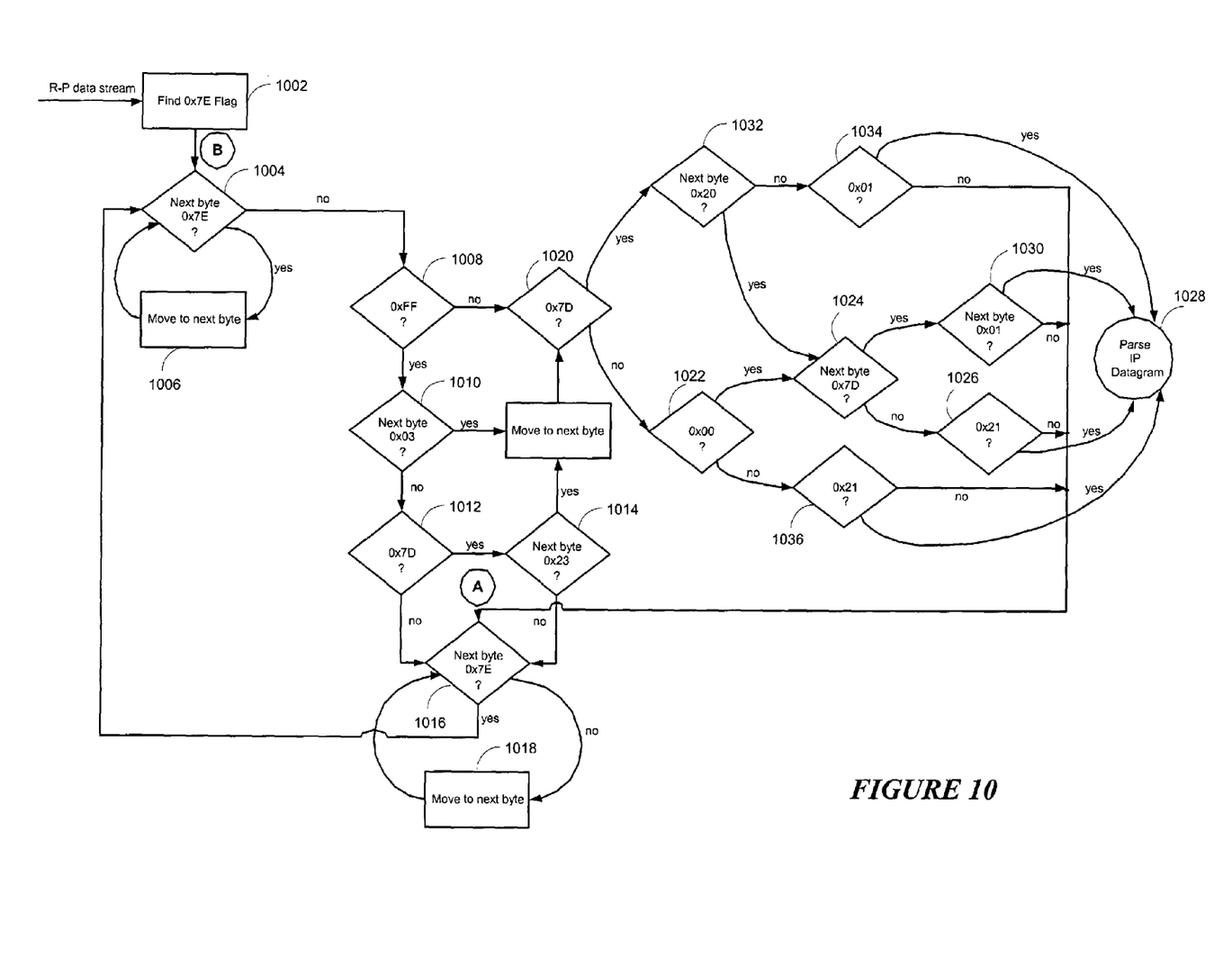
FIG. 10 illustrates a parsing algorithm for the PPP frame shown in FIG. 2.

As noted above, GRE packet 214 arrived at BSC/PCF 104 may contain multiple PPP frames or incomplete frames, which requires BSC/PCF 104 to parse the packet data stream during dormancy state to determine the PPP frame flag sequence. The algorithm that BSC/PCF 104 uses to parse the information stream to determine the beginning of the header portion of the IP datagram 202 is shown in FIG. 10.

If the algorithm detects unrecognized sequence of characters, the algorithm skips to the beginning of the following PPP frame, since it would not know where PPP frame 204 begins. This event may occur as a result of improper PPP implementation or when there exists one or more errors in the data stream. The algorithm continuously checks for presence of "0x7E" flag sequence until it finds a non-null PPP frame. Specifically, after finding a first 0x7E flag, in step 1002, the following byte is checked for 0x7E flag, in step 1004. If the following byte contains another 0x7E flag, meaning that the PPP frame under investigation is null, the process continues checking the subsequent byte, in step 1006. However, if the byte following the byte containing the first 0x7E flag does not contain a 0x7E flag, meaning that a non-null PPP frame is detected, the process checks for the address field 904, in step 1008.

In one embodiment, the address filed 904 and the control filed 906 may be compressed, and hence missing. In addition, the protocol field 908 may also be compressed such that only its second byte, having value of 0xFF, may be present. In such cases, according to RFC 1662, the second byte of the two-octet protocol field 908 should not be set to 0xFF, to avoid it from being mistakenly taken as address field 904, having a value of 0xFF.

Following the check in step 1008 and finding 0xFF corresponding to address field 904, BSC/PCF 104 checks, in step 1010, whether the following byte contains 0x03, corresponding to control field 906. If in step 1010, it is determined that the following byte does not contain 0x03, BSC/PCF 104 checks whether negotiation has resulted in ACCM negotiation for the control field value 0x03. Under ACCM negotiation, BSC/PCF 104 first sends a control scape byte, e.g., 0x7D, and then a byte containing the result of exclusive OR (XOR) of the byte of original information to be sent, e.g., 0x03, with 0x20.

In step 1012, BSC/PCF 104 checks for the presence of 0x7D byte first and, if found, then checks for presence of 0x23, which is the result of 0x03 XORed with 0x20, in step 1014. If either 0x7D or 0x23 is not found, meaning that no control field 906 is detected, the process checks for the beginning of a new PPP frame, in steps 1016 and 1018, similar to steps 1002 and 1004 described above. It should be noted that if the result in step 1008 is "no," the address field 904 is compressed and thus not present.

If in either step 1010 or step 1014, the result is yes, meaning that the value of 0x03 corresponding to control field 906 is detected, directly or through ACCM negotiation, the process checks for the following byte for presence of 0x00, corresponding to the first byte of protocol filed 908. BSC/PCF 104 may first check whether the result of negotiation has been to send the protocol field 908 through ACCM. In step 1020, if a 0x7D byte is not found, meaning that protocol field 908 is not going to be sent through ACCM negotiation, BSC/PCF 104 then checks, in step 1022, whether the following byte contains 0x00, corresponding to the first byte of the protocol field 908.

After BSC/PCF 104 finds 0x00, corresponding to the first byte of the protocol field 908, in step 1022, BSC/PCF 104 checks whether the result of negotiation has been to send the second byte of the protocol field 908 through ACCM negotiation. In steps 1024, if a 0x7D byte is not found, meaning that protocol field 908 is not going to be sent through ACCM negotiation, BSC/PCF 104 then checks, in step 1026, whether the following byte contains 0x21, corresponding to the second byte of the protocol field 908. If 0x21 is found in step 1026, following 0x00 found in step 1022, the process ends up in step 1028, for parsing the header portion of the IP datagram 910, as will be described later herein.

In steps 1024, if a 0x7D byte is found, meaning that protocol field 908 is going to be sent through ACCM negotiation, BSC/PCF then checks, in step 1030, whether the subsequent byte contains 0x01, which is the second byte of the protocol field 908, e.g., 0x21, XORed with 0x20, according to ACCM negotiation. If 0x01 byte is found in step 1030, following 0x00 found in step 1022, the process ends up in step 1028, for parsing the header portion of the IP datagram 910.

Going back to step 1020, searching for the first byte of the protocol field 908, e.g., 0x00, if BCF/PCF 104 finds 0x7D, the following byte is checked for 0x20, which is the first byte of the protocol field 908, e.g., 0x00, XORed with 0x20, in step 1032. If the result in step 1032 is yes, meaning that 0x00 is found in the first byte of the protocol field 908, the process is continued in step 1024, searching for presence of the second byte of the protocol field 908, e.g., 0x21, as discussed above.

In step 1032, if the byte following the byte containing 0x7D does not contain a value corresponding to the first byte of the protocol filed 908, e.g., 0x00, BSC/PCF 102 determines, in step 1034, whether the byte contains 0x00, which is the second byte of the protocol field 908, e.g., 0x21, XORed with 0x20. If the result is yes, the process ends up in step 1028. If the result of checking for the protocol field 908 ends up in not finding the second byte of protocol field 908, e.g., 0x21, the process end up in step 1016, looking for the following PPP frame.

It should be noted that if the result in step 1022 is "no", meaning that the first byte of the protocol field 908 is not found, this filed is compressed. Thus, only presence of its second byte, e.g., 0x21, is checked in step 1036.

IP Datagram Parsing Algorithm

Figure 11:
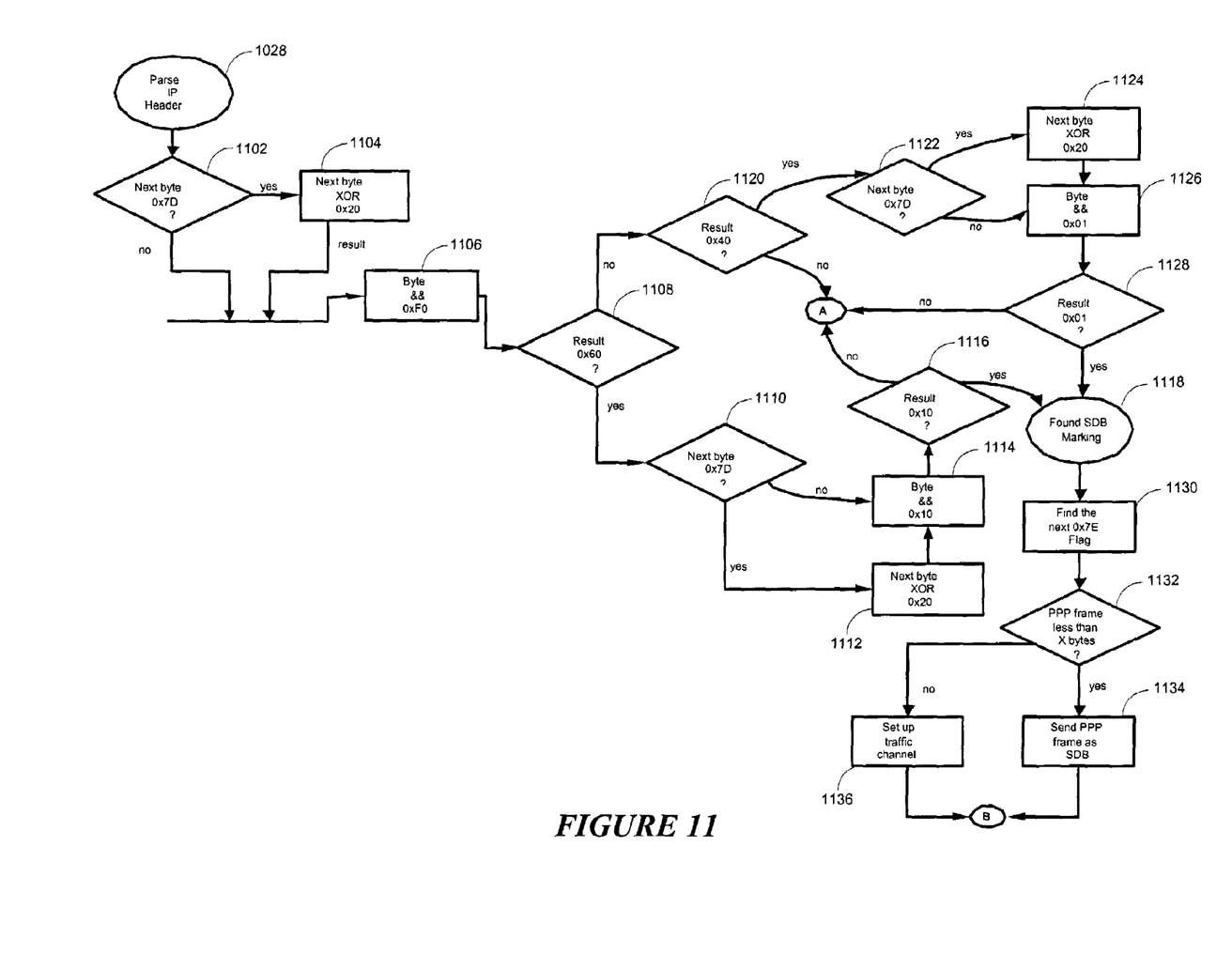
FIG. 11 illustrates a parsing algorithm for the header portion of an IP datagram shown in FIG. 4 and FIG. 8.

Once the PPP Frame Parsing algorithm has reached the "Parse IP datagram" state 1028, indicating that the algorithm has successfully detected the beginning of an IP datagram 910, BSC/PCF 104 then utilizes an algorithm, according to one embodiment as shown in FIG. 11, to parse the header portion 400 (FIG. 4) or 800 (FIG. 8) of the IP datagram 910 to detect if SDB marking is present. In one embodiment, the parsing algorithm assumes the four bytes of the 32-bit header portions 400 and 800 are transmitted in the following order: bits 0–7 first, bits 8–15, bits 16–23, and bits 24–31 last. This ordering is called big endian byte ordering, which is the byte ordering used in all binary integer in the TCP/IP headers as they traverse a network. This ordering is also called network-byte order. If BSC/PCF 104 stores binary integers in other formats, such as in little endian byte ordering, BSC/PCF 104 converts the header values into network-byte order before running the algorithm, or makes appropriate mapping such that the algorithm is executed properly.

The IPv4 TOS field 402 (FIG. 4) and the IPv6 traffic class 802 (FIG. 8) start with a 4-bit version field. The 4-bit version field contains the IP version number. For IPv4 and IPv6 versions, the version number is 0x04 and 0x06, respectively. For determining the version number, the algorithm shown in FIG. 11 checks whether the first byte of the header portion of the IP dtagram 910 is transmitted according to ACCM negotiation or rather directly. If the first byte of the header portion is found to contain 0x7D, in step 1102, meaning that the first byte of the header portion is negotiated according to ACCM, the algorithm then XORs the following byte with 0x20, in step 1104, to undue the XOR function with 0x20, hence recovering the original value.

In step 1106, the original content of the first byte of the IP header, received from step 1102, or the result received from step 1104 is bite-wise ANDed with 0xF0, to read the firt four bits of the header portion. In step 1108, the result of step 1106 is checked against 0x60, to determine whether the first four bits of the header portion indicates that the version number is IPv6.

If the result of step 1108 indicates the version is IPv6, the process continues in steps 1110, 1112, 1114, and 1116, to determine whether the fifth bit of the traffic class 802 (FIG. 8) is set, indicating SDB marking. If the result of step 1116 indicates that the SDB bit is set, the process ends up in step 1118.

Continuing with 1120, if the result indicates the version number of the header portion is IPv4, the process continues in steps 1122, 1124, 1126, and 1128, to determine whether the eight bit of the TOS field 402 (FIG. 4) is set, indicating SDB marking. If the result of step 1128 indicates that the SDB bit is set, the process ends up in step 1118.

Once SDB marking is found, BSC/PCF 104 detects the next flag sequence to find the end of the PPP frame under examination. More than two IP datagrams, where the first IP datagram contains SDB marking, may have been encapsulated within a single PPP frame arrived at the BSC/PCF 104. In addition, an IP datagram with a SDB marking may exceed the expected size. When either one of the above two events occurs, it is expected that the message received is large. To prevent a large SDB message from being sent over the common channel, during a dormant packet data session, additional check may be performed. In step 1130, the end of the PPP frame under consideration is detected and, if the number of bytes in the PPP frame is below an allowed number, as determined in step 1132, the PPP frame is sent as SDB, in step 1134. Otherwise, if the number of bytes in the PPP frame exceeds the allowed number, the traffic channel is re-established to send the PPP frame in step 1136, regardless of SDB marking.

The procedure that the BSC/PCF uses to transmit SDB over the air interface is shown in FIG. 1, according to one embodiment. During dormant packet data session, it is likely that only one PPP frame is destined to MS 106 from the PDSN 102. To avoid excessive processing, it may be feasible for BSC/PCF 104 to process only few PPP frames that arrive simultaneously during packet data dormancy.

Simplified Parsing Algorithm

In one embodiment, where the LCP negotiated parameters, ACCM negotiation, and IP addressing scheme are known to BSC/PCF 104, the above parsing algorithms may be simplified. In such cases, the following configurations may be known to BSC/PCF 104:

Address field 904 and control field 906 compression is enabled

Protocol field 908 compression is enabled

ACCM has value of 0x00000000

IPv4 addressing scheme is used

Figure 12:
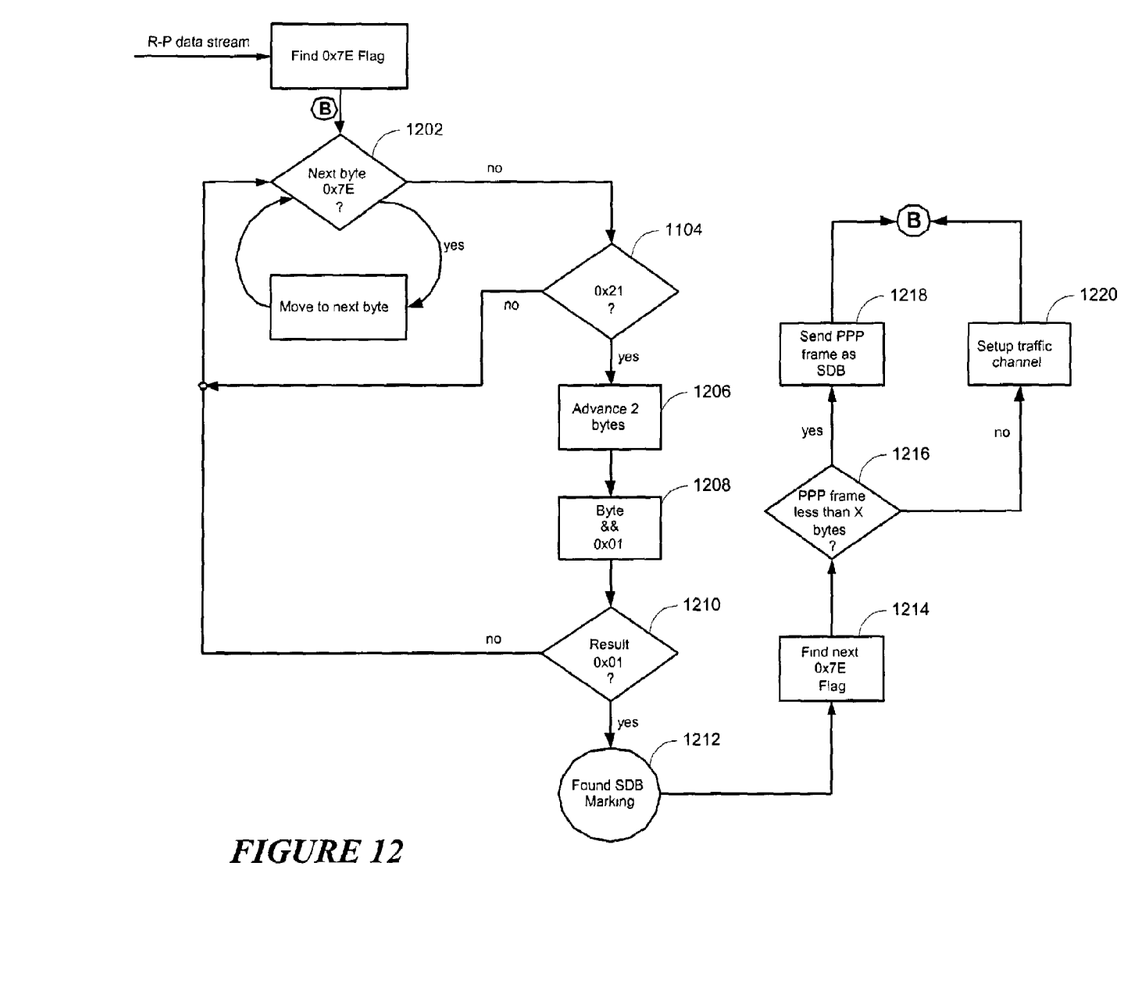
FIG. 12 illustrates a simplified parsing algorithm.

The PPP frame and IP datagram parsing algorithms shown in FIG. 10 and FIG. 11, respectively, are collectively simplified as shown in FIG. 12, according to one embodiment. Upon detecting a non-null PPP frame in step 1202, the process checks for presence of the second byte of protocol field 908, e.g., 0x21, in step 1204, noting that the first byte of the protocol filed is removed during the filed compression negotiation. If found, the process skips the first byte of the header portion as shown in FIG. 4, to reach the TOS field 402, instep 1206. In steps 1208 and 1210, the process checks whether the LSB of the TOS filed 402, as shown in FIG. 6, for example, is set and, if so, the process indicates SDB marking in step 1212. The process then continues with steps 1214 through 1220 to check for the size of the SDB messages, similar to steps 1130 through 1136 in FIG. 11. If the size criterion is met, the PPP frame is sent as SDB. Otherwise, traffic channel is re-established, in step 1220, before sending the PPP frame.

Therefore, the disclosed embodiments provide for an efficient and reliable system and method for determining whether information destined to a target mobile station, which is in dormant mode, should be sent as SDB messages, without waiting for the traffic channel to be re-established.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration."

The invention claimed is:

1. A method for determining whether information destined for a target mobile station is marked to be sent as short data burst, the method comprising:
   receiving an information packet destined to a target mobile station;
   parsing the received information packet;
   determining whether the received information packet is marked for short data burst (SDB) delivery.

2. The method of claim 1, wherein the information packet includes a header portion and an information portion.

3. The method of claim 2, wherein said parsing includes parsing the header portion.

4. The method of claim 3, wherein said parsing further includes detecting a SDB marking.

5. A computer-readable medium embodying a method for determining whether information destined for a target mobile station is marked to be sent as short data burst, the method comprising:
   receiving an information packet destined to a target mobile station;
   parsing the received information packet;
   determining whether the received information packet is marked for short data burst (SDB) delivery.

6. The computer-readable medium of claim 5, wherein the information packet includes a header portion and an information portion.

7. The computer-readable medium of claim 6, wherein said parsing includes parsing the header portion.

8. The computer-readable medium of claim 7, wherein said parsing further includes detecting a SDB marking.

9. An apparatus for determining whether information destined for a target mobile station is marked to be sent as short data burst, comprising:
   means for receiving an information packet destined to a target mobile station;
   means for parsing the received information packet;
   means for determining whether the received information packet is marked for short data burst (SDB) delivery.

10. The apparatus of claim 9, wherein the information packet includes a header portion and an information portion.

11. The apparatus of claim 10, wherein said means for parsing includes means for parsing the header portion.

12. The apparatus of claim 11, wherein said means for parsing further includes means for detecting a SDB marking.

13. An apparatus for determining whether information destined for a target mobile station is marked to be sent as short data burst, comprising:
   a receiver capable of receiving information;
   a transmitter capable of transmitting information to a target mobile station; and
   a processor capable of carrying out a method, the method comprising:
      receiving an information packet destined to a target mobile station;
      parsing the received information packet;
      determining whether the received information packet is marked for short data burst (SDB) delivery.

14. The apparatus of claim 13, wherein the information packet includes a header portion and an information portion.

15. The apparatus of claim 14, wherein said parsing includes parsing the header portion.

16. The apparatus of claim 15, wherein said parsing further includes detecting a SDB marking.

17. A method for marking information for short data burst (SDB) delivery in a wireless communication network, the method comprising:
encapsulating information in a datagram, the datagram including a header portion; and
marking the header portion of the datagram such that a wireless communication infrastructure delivers the information encapsulated in the datagram to a destination as SDB messages.

18. The method of claim 17, wherein said marking includes marking a type of field (TOS) of the header portion.

19. The method of claim 17, said marking includes marking a traffic class filed of the header portion.

20. A computer-readable medium embodying a method for marking information for short data burst (SDB) delivery in a wireless communication network, the method comprising:
encapsulating information in a datagram, the datagram including a header portion; and
marking the header portion of the datagram such that a wireless communication infrastructure delivers the information encapsulated in the datagram to a destination as SDB messages.

21. The computer-readable medium of claim 20, said marking includes marking a type of field (TOS) of the header portion.

22. The computer-readable medium of claim 20, said marking includes marking a traffic class filed of the header portion.

23. An apparatus for marking information for short data burst (SDB) delivery in a wireless communication network, comprising:
means for encapsulating information in a datagram, the datagram including a header portion; and
means for marking the header portion of the datagram such that a wireless communication infrastructure delivers the information encapsulated in the datagram to a destination as SDB messages.

24. The apparatus of claim 23, said means for marking includes means for marking a type of field (TOS) of the header portion.

25. The apparatus of claim 23, said means for marking includes means for marking a traffic class filed of the header portion.

26. An apparatus for marking information for short data burst (SDB) delivery in a wireless communication network, comprising:
a receiver capable of receiving information;
a transmitter capable of transmitting information to a target mobile station; and
a processor capable of carrying out a method, the method comprising:
encapsulating information in a datagram, the datagram including a header portion; and
marking the header portion of the datagram such that a wireless communication infrastructure delivers the information encapsulated in the datagram to a destination as SDB messages.

27. The apparatus of claim 26, said marking includes marking a type of field (TOS) of the header portion.

28. The apparatus of claim 26, wherein said marking includes marking a traffic class filed of the header portion.

* * * * *